July 25, 1933.  C. J. BLAKESLEE  1,919,924
WHEEL
Filed Dec. 1, 1930
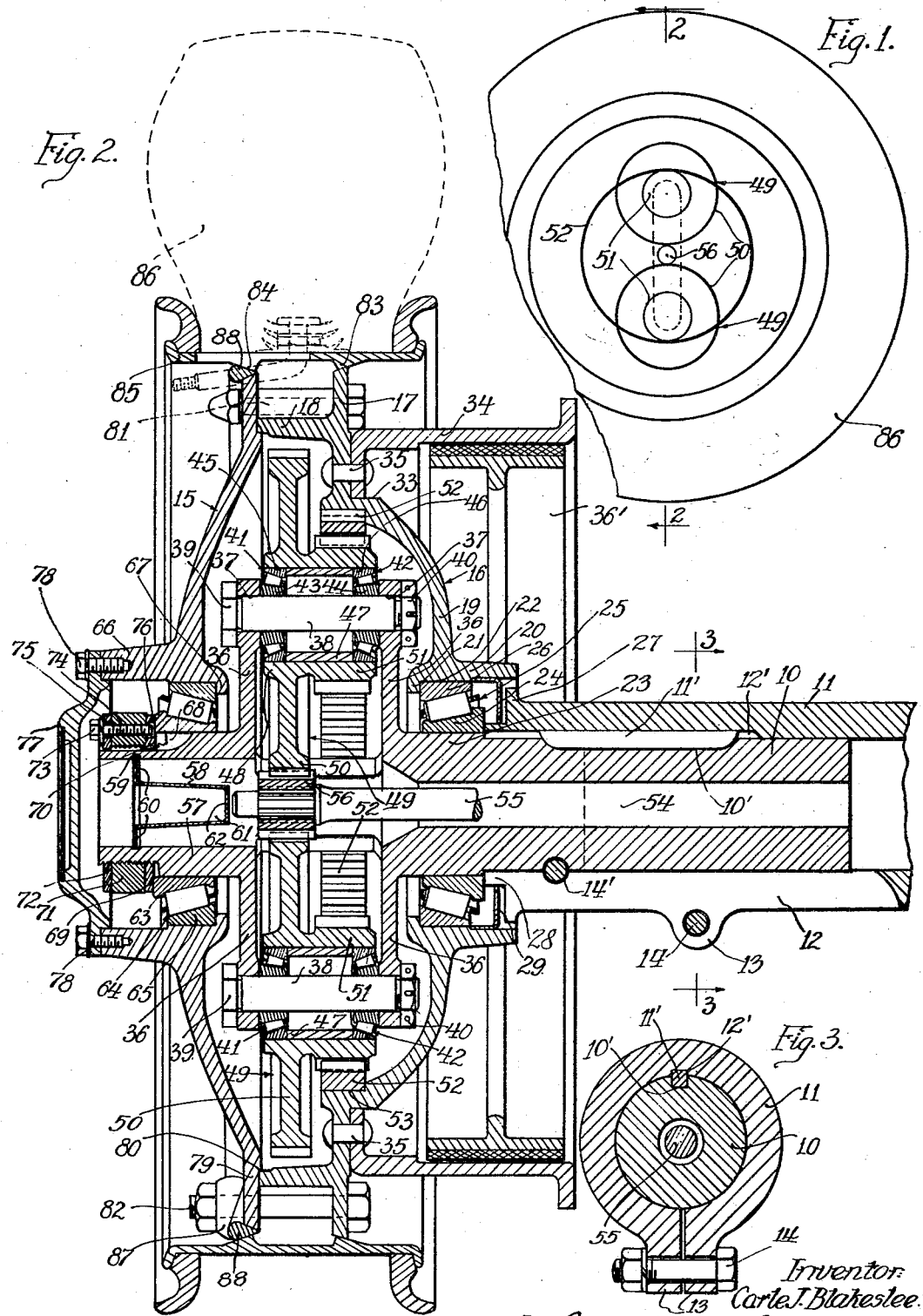
Inventor:
Carl J. Blakeslee Patented July 25, 1933

1,919,924

UNITED STATES PATENT OFFICE

CARLE J. BLAKESLEE, OF CHICAGO, ILLINOIS, ASSIGNOR TO WALKER VEHICLE CO., OF CHICAGO, ILLINOIS, A CORPORATION OF ILLINOIS

WHEEL

Application filed December 1, 1930. Serial No. 499,173.

This invention relates to wheels and more particularly to driving wheels for trucks and the like where a relatively great reduction in speed and consequently increased torque are desired. The herein disclosed wheel is particularly well adapted for electrical vehicles but it may also be employed for vehicles employing other forms of motive power.

Where a relatively large reduction in speed between the driving engine or electric motor and the propelling wheels is desired it is not desirable to embody the entire reduction in the differential because of the requirement for an unusually large ring gear. This would in turn require an objectionably large and heavy axle housing.

There has been developed heretofore the so-called Walker drive for embodying the gear reduction, or a large part of the same, in the traction wheels. In the form employed by my assignee a stub axle is inserted into the end of the axle housing. The axle housing carries a driving motor and/or differential with spindles extending to each stub axle. The stub axle carries preferably a pair of idlers on bearings supported by the stub axle, the corresponding driving spindle having a pinion meshing with the idlers. The idlers in turn mesh with an internal ring gear which has heretofore formed substantially the outer periphery of the wheel in order to obtain the desired gear reduction. The body of the wheel has been formed of a pair of opposed discs, mounted centrally on bearings on the stub axle and peripherally being clamped or riveted together through the ring gear.

Where, as in the Walker balanced drive, two idlers are employed, the pinion needs no bearing support, as its support is gained from the idlers which are in fixed mesh with the internal ring gear.

According to my invention I provide a compound gear reduction in the wheel. I am aware that compound reductions have heretofore been proposed and I do not claim this feature alone. However, I have provided certain marked improvements in structure and mode of operation, which will be more apparent from the following detailed description of a particular construction embodying my invention.

Some of the new and/or improved features and results secured by my improved compound gear reduction are as follows:

First, by my construction a greater reduction can be secured in the same diametrical dimensions;

Second, the diameter of the wheel may be reduced to adapt it to the use of balloon tires;

Third, the internal ring gear may be enclosed without bolts or rivets therethrough;

Fourth, the pocket or annular space in which the large gear of the compound idler is disposed and in which lubricant is contained, may trap any chips, dirt, or other non-lubricating substances or impurities which may inadvertently or accidentally be included within the wheel;

Fifth, a better and more easily obtained seal for the periphery of the wheel is attained;

Sixth, the outer peripheries of the front and back wheel discs may be formed to adapt them to the desired wheel rim without interfering with the seal between them;

Seventh, a better bearing for the compound gear is provided by the use of anti-friction bearings;

Eighth, the bearings for the compound gear are provided with convenient take-ups for wear to adjust the said compound gears;

Ninth, the brake drums may be connected to the inner wheel discs radially outside the internal ring gear so that the braking stresses do not act upon the means holding the disc or discs to the ring gear.

Other improvements will be apparent from the following specification and claims.

The preferred embodiment of my invention provides a wheel comprising a pair of opposed dished discs suitably antifrictionally supported upon a stub axle, which is suitably supported by the main axle housing. Two pairs of radially extending bearing arms or brackets are provided on the stub axle disposed between the dished discs. Between the outer ends of each pair of arms is supported a compound idler gear, suitably antifrictionally mounted upon pins or journals. Preferably the antifriction means comprises tapered roller bearings. The arms readily sustain the radial thrusts imparted thereto but may be flexed toward each other by threaded nuts on the bearing pins to adjust the bearings or take up any play that might develop by wear. The bearings for the compound idlers are disposed at opposite ends of the same and thus a very substantial and stable bearing support is provided.

Preferably the pinions of the compound idler are disposed inwardly and are adapted to mesh with an internal ring gear supported in the inner dished disc member at a point between the main bearing supporting portion thereof and the portion of the flange thereof. The brake drum and internal gear are thus preferably connected to the same disc. The inner dished disc is provided with a cylindrical annular flange which is adapted to engage and seat upon a suitable seat provided on the inner side of the flange of the outer dished disc to form a tight joint when the two discs are drawn together in assembled condition. The cylindrical flange might be mounted upon the other disc or be formed as a separate piece and merely piloted centrally of said discs by suitable annular shoulders on them as shown between the outer disc and the cylindrical flange.

The wheel and its bearings and the internal drive structure may be suitably lubricated by lubricant retained in the wheel structure.

The main pinion and its shaft are, in the preferred form, free floating, being supported by the two gears of the compound idlers, a suitable stop member being provided adjacent the outer end of the stub axle to prevent longitudinal displacement of the main pinion shaft axially of the stub axle. Where only one compound idler is to be employed the pinion must then be provided with supporting bearings in the stub axle.

Other features and advantages of the invention will appear from the following detailed description of a preferred embodiment thereof illustrated in the accompanying drawing, in which:

Figure 1 is a fragmentary elevation of a wheel illustrating diagrammatically the relative positions of the main pinion, the idler gear pinions and the internal ring gear with respect to the wheel structure.

Figure 2 is an enlarged fragmentary section taken along the line 2—2 of Figure 1; and Figure 3 is a section taken along the line 3—3 of Fig. 2.

In the embodiment of the invention disclosed in the drawing the wheel and its associated structure are suitably supported upon a tubular, non-rotatable stub axle 10 having a shank portion thereof extending into the end of an axle housing 11, having the outer end thereof slotted to form a split clamp 12, having a pair of clamping ears 13 which are drawn together by a bolt 14. Along its upper side the stub axle 10 is provided with a key seat 10' accommodating a key 11' cooperating with a key-way 12' in the upper inner periphery of the main axle housing 11, to prevent rotation of the axle 10 relative to housing 11. Adjacent the outer end of housing 11 a second bolt 14' passing through a transverse groove in the under side of axle 10 and a cooperating transverse bore in housing 11 is adapted to aid the clamping action of bolt 14 and simultaneously serves as a cross key or pin to prevent longitudinal displacement of axle 10.

The wheel itself comprises two opposed dished discs 15 and 16, the former being the outer disc and the latter the inner. The inner disc 16 is provided with a flat peripheral flange portion 17 having extending therefrom and outwardly toward the outer disc 15 a cylindrical flange 18 adjacent the outermost periphery thereof. Between the outermost periphery and the central portion thereof the disc 16 is provided with a convex or dished portion 19 which terminates at the central portion in a cylindrical bearing flange 20, provided at its inner end with a radially extending flange 21, providing a suitable annular seat 22 to receive the outer race 26 of the roller bearings 25.

On the outer periphery and in opposed relation to the annular seat 22, the stub axle 10 is provided with an enlarged portion 23 forming a seat for the inner race 24 of a tapered roller anti-friction bearing 25, the outer race 26 thereof being seated in the annular seat 22. An integral peripheral flange 27 formed adjacent the outer end of housing 11 is adapted to fit into the outer end of the flange 20 of disc 16, the extreme outer end of housing 11 being provided with a reduced portion 28 adapted to act as an inward abutment for the inner race 24 of roller bearing 25 and resting against a shoulder at the end of the seat 23. To prevent the access of dirt or other foreign matter to the bearing 25 and to retain any lubricant which finds its way through the bearing 25 to the outer side thereof, a cupped ring 29 is frictionally seated in the inner periphery of the flange 20 of the disc 16 and supports therein in contact with the reduced neck 28 a felt ring, not shown. It will be readily apparent that the reduced end 28 precludes outward displacement of the inner race 24 of bearing 25 by providing in assembled position of the axle 10 within the main axle housing 11 a fixed abutment therefor.

At the juncture of the convex or dished portion 19 of the disc 16 with the straight flange 17 an outer peripheral seat 33 is provided to accommodate the inner flange periphery of a brake drum 34 suitably secured to the straight flange portion 17 as by means of rivets 35, the brake drum 34 suitably accommodating an internal expanding brake 36' in any suitable or desired manner. The brake drum is attached to the same disc as that to which the ring gear is connected but outside the same. This is advantageous in that if the power and the brake are simultaneously active it will not tend to wrench the wheel. In radially opposed relation and adjacent the outer end thereof, the stub axle 10 is provided with integral, parallel, outwardly extending plate-like bearing bracket portions 36. These frame or bearing brackets are preferably formed as an integral part of the forging of which the stub axle is composed or they may be separately formed and joined to the stub axle portion as by fusion welds. These plate-like portions 36 afford great strength against forces acting circumferentially of the stub axle 10 but afford only limited resistance to deflection axially of the stub axle 10. Adjacent the apex of each bracket portion 36 there is provided a suitable hole 37, the holes of each pair of opposed plate-like portions 36 being in alignment to accommodate a pin or journal member 38 provided at one end thereof with a polygonally shaped head 39 and having its other end split and threaded to accommodate a castellated nut 40, whereby the opposed pair of plate-like members 36 may be drawn toward each other for adjustment of the bearings. Each journal member 38 supports a pair of tapered roller bearings 41 and 42, the inner races 43 and 44 of which have their outer sides in engagement with the inner faces of the bosses formed on the ends of the bracket members 36. The outer races 45 and 46 of the bearings 41 and 42 are maintained in definite spaced relationship by means of a bushing 47 forced into the inside of the compound gear by a press fit. The outer races 45—46 of the bearings 41—42 engage the inner periphery of the hub portion 48 of the compound idler gear 49 comprising a gear part 50 and pinion part 51 preferably formed integrally in concentric arrangement on hub portion 48. Pinion 51 of gear pinion 49 meshes with an internal ring gear 52 suitably keyed or pinned in a suitable annular seat 53 formed at the inner side of the disc 16 at the juncture of the dished portion 19 and the straight flange 17.

It will be readily apparent that since the plate-like bracket members 36 are somewhat resilient laterally, the bearings 41 and 42 may be readily taken up by drawing up on the nut 40, thereby drawing the inner races 43 and 44 of the bearings 41 and 42 respectively toward each other, the outer races 45 and 46 remaining in positive spaced relationship during such drawing up action. Thus accurate adjustment in initial assembly, or to take up any possible wear is provided, and a quiet drive assured.

The stub axle 10 is preferably formed from round bar stock suitably drilled and machined to provide a centrally disposed axial bore 54 which accommodates a shaft or spindle 55 suitably connected through a differential with the usual driving motor (not shown) at one end, the other end thereof being provided with a pinion 56 suitably keyed thereto. Pinion 56 meshes with the teeth of the gear portions 50 of the idler gear pinions 49 thereby transmitting propelling power from the motor to the ring gear 52, the latter in turn transmitting such power to the disc 16. The gear pinion cages are preferably formed by milling out upper and lower openings in stub axle 10 and then welding the plate-like portions 36 to the stub axle along the longitudinally opposed edges defining the openings in diametrically opposed relation.

The outer end of the stub axle 10 is formed with a portion 57 having a bore 58 of larger internal dimension than the bore 54 and is provided adjacent its extreme outer end with an annular groove 59 into which the yielding opposed flanges 60 of a substantially U-shaped retaining member 61 is adapted to be seated, the end 62 of which is disposed in proximity to the extreme outer end of the shaft 55, thereby preventing axial displacement outwardly of said shaft 55. The outer periphery of the enlarged portion 57 carries thereon the inner race 63 of a tapered roller bearing 64. The outer race 65 of this bearing is seated in the inner periphery of the hub portion 66 of the disc 15 and in abutment with a radial flange 67.

The extreme outer end of the enlarged portion 57 of the stub axle 10 is slightly reduced and threaded and along its upper side is provided with an axially extending key slot 68. An inner ring 69 formed with a radially inwardly extending lip 70 is slipped over the threaded end of the enlarged portion 57 of the stub axle 10, with the lip 70 disposed in the key slot 68, and its inner face is adapted to abut against the outer face of the inner race 63 of the roller bearing 64. A suitable ring nut 71 is then threaded over the threaded end of the enlarged portion 57 of the stub axle 10, thereby drawing up on the inner race 63 of the bearing 64. A ring 72 similar in character to ring 69 is then slipped over the end of the enlarged portion 57 of the stub axle 10 and a bolt 73 is then threaded into a threaded recess 74 provided in the ring nut 71 and passes through recesses 75 and 76 provided in rings 72 and 69 respectively, thereby suitably interlocking the ring nut 71 with the enlarged portion 57 of the stub axle 10.

The outer end of the hub portion 66 of the disc 15 is suitably sealed by a hub cap 77 suitably secured to the end of the hub 66 as by means of bolts 78.

The straight flange portion 79 of the disc 15 is provided at its inner face with an annular seat 80 and a piloting shoulder to receive the free edge of the laterally extending flange 18 of the disc 16. The two discs are clamped together by bolts 81 which may be provided with spacing collars to limit the bending stress upon the outer margins of the flanges 17 and 79. The bolts 81 extend through the plates 17 and 79 outside the flange 18 so that a fluid tight annular chamber is provided.

The peripheral edge of the laterally inner straight flange 17 of the disc 16 is formed on a taper to accommodate a similarly tapered internal flange 83 of a rim 85 which carries a pneumatic tire 86 in any preferable or desired manner. The rim 85 also includes a second and oppositely disposed tapered internal flange 84. The flanges 83 and 84 are spaced a distance apart so that when the flange 83 is seated on the straight flange 17 of the disc 16 the internal flange 84 comes opposite the straight flange 79 formed on the laterally outer disc 15. The peripheral edge of the latter flange is also tapered, as best illustrated in Figure 2. The tapered surfaces on the flanges 79 and 84 form wedge surfaces between which a clamping ring 88 is disposed. Rim lugs 87 and bolts 82 extending through the flanges 17 and 79 serve to clamp the ring 88 between the cooperating wedging surfaces whereby the tire carrying rim 85 is secured to the wheel. The rim lugs 87 may be of conventional construction.

By referring to Figure 1, the relative positions of the driving pinion 56, the idler gear pinions 49 and internal ring gear 52 are diagrammatically shown and the arrangement of these parts will be readily determinable.

Inasmuch as the inner race 24 of the bearing 25 abuts the end of reduced portion 28, it will be clear that upon drawing up on the inner race 63 of the bearing 64 by means of the ring nut 71, since the discs 15 and 16 are substantially integral due to to their securement by means of the bolts 81 and 82, the bearings 25 and 64 may be readily taken up when required.

I have found that in practice the internal drive wheel structure illustrated may be satisfactorily constructed to provide a ratio of 18.33 to 1, such provision being readily adaptable for the driving of electrically propelled vehicles of the class deriving energy from storage batteries in an efficient manner.

It will readily be seen that with the disposition of the internal ring gear 52 concentrically inwardly of the largest internal annular periphery of the wheel, such grit, dirt, caked grease and gear chips as are thrown outwardly by centrifugal force will be collected at a portion of the wheel other than at the ring gear thereby materially increasing the efficiency and life of the internal drive arrangement and rendering its operation noiseless. By employing tapered roller bearings for antifrictionally supporting the gear pinions and providing take-up thereof by virtue of the lateral yieldability of plate-like portions 36, adjustments for wear may be quickly and readily accomplished inasmuch as substantial strain is imposed through the gear pinions and bearings upon the pins or journals by reason of the power transmission being effected to one side of the plane of the gear portions of the gear pinions.

It will be of course understood that the wheel and driving parts are first assembled upon the stub axle 10, the latter then mounted in the main axle housing 11 and the bearings 25 and 64 then taken up.

While I have illustrated a preferred embodiment of my invention, I do not wish to be limited thereto. It will be understood by those skilled in the art that certain changes may be made therein without departing from the essence of the invention or the spirit and scope of the appended claims.

What I claim and desire to secure by Letters Patent is:

1. In an internal drive axle structure, the combination of a tubular non-rotatable axle, a gear cage connected with said axle and comprising a pair of spaced radially disposed members having sufficient rigidity to sustain circumferential torque reaction with respect to the axle, and being flexible longitudinally of the axle for flexion toward each other, a journal member extending through said spaced members, anti-friction means carried by said journal member, and a gear associated with said anti-friction means, said radially disposed members being adapted to exert axial pressure on said anti-friction means upon drawing up movement imparted to said journal member to take up wear on said anti-friction means.

2. In an internal drive axle structure, the combination of a tubular non-rotatable axle, a gear cage non-rotatably carried by said axle and comprising a pair of spaced radially disposed members having sufficient rigidity to sustain circumferential torque reaction with respect to the axle, and being flexible longitudinally of the axle for flexion toward each other, a journal member extending through said spaced members, tapered roller bearings carried by said journal member, a spacing means adapted to maintain the outer races of said bearings in definite spaced relationship, and a gear having a hub carried by said outer races, said radially disposed members being adapted to exert axial pressure on said bearings upon drawing up movement imparted to said journal member to take up wear on said bearings.

3. In combination, a tubular non-rotatable axle, a wheel comprising a pair of opposed dished members anti-frictionally supported upon said axle, a gear cage substantially rigid with said axle and comprising a pair of spaced radially disposed members having sufficient rigidity to sustain circumferential torque reaction with respect to said axle and being flexible longitudinally of the axle for flexion toward each other, a journal member extending through said spaced members, anti-friction means carried by said journal member, a gear-pinion supported by said antifriction means, said radially disposed members being adapted to exert axial pressure on said anti-friction means upon drawing up movement imparted to said journal member to take up wear on said anti-friction means, a pinion meshing with the gear portion of said gear-pinion, and an internal ring gear carried by one of said dished members and meshing with the pinion portion of said gear pinion whereby tractive power may be imparted to said wheel from said live axle.

4. In combination, a tubular non-rotatable axle, a wheel comprising a pair of opposed dished members anti-frictionally supported upon said axle, a gear cage substantially rigid with said angle and comprising a pair of spaced radially disposed members having sufficient rigidity to sustain circumferential torque reaction with respect to said axle and being flexible longitudinally of the axle for flexion toward each other, a journal member extending through said spaced members, tapered roller bearings carried by said journal member, a spacing means adapted to maintain the outer races of said bearings in definite spaced relationship, a gear-pinion supported by said outer races, said radially disposed members being adapted to exert axial pressure on the inner races of said bearings upon drawing up movement imparted to said journal member to take up wear on said bearing, a live axle in said axle having a pinion meshing with the gear portion of said gear-pinion, and an internal ring gear carried by one of said dished members and meshing with the pinion portion of said gear-pinion whereby tractive power may be imparted to said wheel from said live axle.

5. In combination, a tubular non-rotatable axle, a wheel comprising a pair of opposed dished members anti-frictionally supported upon said axle, a gear cage substantially rigid with said axle and comprising a pair of spaced radially disposed members having sufficient rigidity to sustain circumferental torque reaction with respect to said axle and being flexible longitudinally of the axle for flexion toward each other, a journal member extending through said spaced members, anti-friction means carried by said journal member, a gear-pinion supported by said anti-friction means, said radially disposed members being adapted to exert axial pressure on said anti-friction means upon drawing up movement imparted to said journal member to take up wear on said anti-friction means, a live axle in said axle having a pinion meshing with the gear portion of said gear-pinion, and an internal ring gear carried by one of said dished members and to one side of the largest internal periphery of said wheel and meshing with the pinion portion of said gear-pinion whereby tractive power may be imparted to said wheel from said live axle.

6. In combination, a tubular non-rotatable axle, a wheel comprising a pair of opposed dished members anti-frictionally supported upon said axle, a gear cage substantially rigid with said axle and comprising a pair of spaced radially disposed members having sufficient rigidity to sustain circumferential torque reaction with respect to said axle and being flexible longitudinally of the axle for flexion toward each other, a journal member extending through said spaced members, tapered roller bearings carried by said journal member, a spacing means adapted to maintain the outer races of said bearings in definite spaced relationship, a gear-pinion supported by said outer races, said radially disposed members being adapted to exert axial pressure on the inner races of said bearings upon drawing up movement imparted to said journal member to take up wear on said bearings, a live axle in said axle having a pinion meshing with the gear portion of said gear-pinion, and an internal ring gear carried by one of said dished members and to one side of the largest internal periphery of said wheel and meshing with the pinion portion of said gear-pinion whereby tractive power may be imparted to said wheel from said live axle.

CARLE J. BLAKESLEE.